US007147311B2

(12) United States Patent
Stellbrink et al.

(10) Patent No.: US 7,147,311 B2
(45) Date of Patent: Dec. 12, 2006

(54) FLUID SUPPLY MEDIA

(75) Inventors: Joseph Stellbrink, Lebanon, OR (US); Eric L. Ahlvin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 10/808,998

(22) Filed: Mar. 25, 2004

(65) Prior Publication Data

US 2005/0212876 A1 Sep. 29, 2005

(51) Int. Cl.
*B41J 2/175* (2006.01)
*B01D 24/00* (2006.01)
*C08J 9/00* (2006.01)

(52) U.S. Cl. .......................... 347/86; 210/506; 521/50

(58) Field of Classification Search ................. 347/85, 347/86; 210/500.1, 500.23, 504, 506; 521/50; 106/31.65, 31.66
See application file for complete search history.

(56) References Cited

U.S. PATENT DOCUMENTS

| | | | |
|---|---|---|---|
| 5,489,932 A | 2/1996 | Ceschin et al. | |
| 5,555,007 A | 9/1996 | Ceschin et al. | |
| 5,963,238 A | 10/1999 | Scheffelin et al. | |
| 5,966,156 A | 10/1999 | Scheffelin et al. | |
| 6,286,950 B1 | 9/2001 | Altendorf et al. | |
| 6,660,175 B1 | 12/2003 | Kawamura et al. | |
| 6,676,252 B1 | 1/2004 | Bilotta et al. | |
| 6,679,594 B1 | 1/2004 | Sesek et al. | |
| 6,692,115 B1 * | 2/2004 | Sanada et al. | 347/85 |
| 6,766,817 B1 | 7/2004 | da Silva | |
| 2003/0047109 A1 * | 3/2003 | Lee et al. | 106/31.58 |

* cited by examiner

*Primary Examiner*—Anh T. N. Vo

(57) ABSTRACT

A fluid supply media includes a material having pores and a lamellae inhibiting agent retained relative to the material proximate to the pores.

58 Claims, 4 Drawing Sheets

FLUID SUPPLY MEDIA

CROSS-REFERENCE TO RELATED APPLICATION

The present application is related to co-pending patent application Ser. No. 10/811,127 filed on the same day herewith by Anthony D. Studer, Kevin D. Almen, David J. Benson, David M. Hagen, and Cary R. Bybee and entitled "Fluid Supply Having a Fluid Absorbing Material", the full disclosure of which is hereby incorporated by reference.

BACKGROUND

Fluid supplies are employed in a wide variety of applications to provide a source of fluid for an application. One common example of a fluid supply is the ink-containing portion of an inkjet print cartridge. Such cartridges typically utilize an ink-absorbing porous material, having a multitude of pores. The porous material and its pores wick or draw the fluid toward a discharge point through capillary action. For some fluids, particularly those containing various surfactants, as the fluid is drawn toward the discharge point, the fluid leaves a thin liquid film or lamellae behind. These lamellae block the pores and pore entrances, reducing the fluid-storing capacity of the porous media during subsequent fluid fills.

SUMMARY OF THE INVENTION

According to one exemplary embodiment, a fluid supply media includes a material having pores and a lamellae inhibiting agent retained relative to the material proximate to the pores.

DETAILED DESCRIPTION OF EXAMPLE EMBODIMENTS

Figure 1:
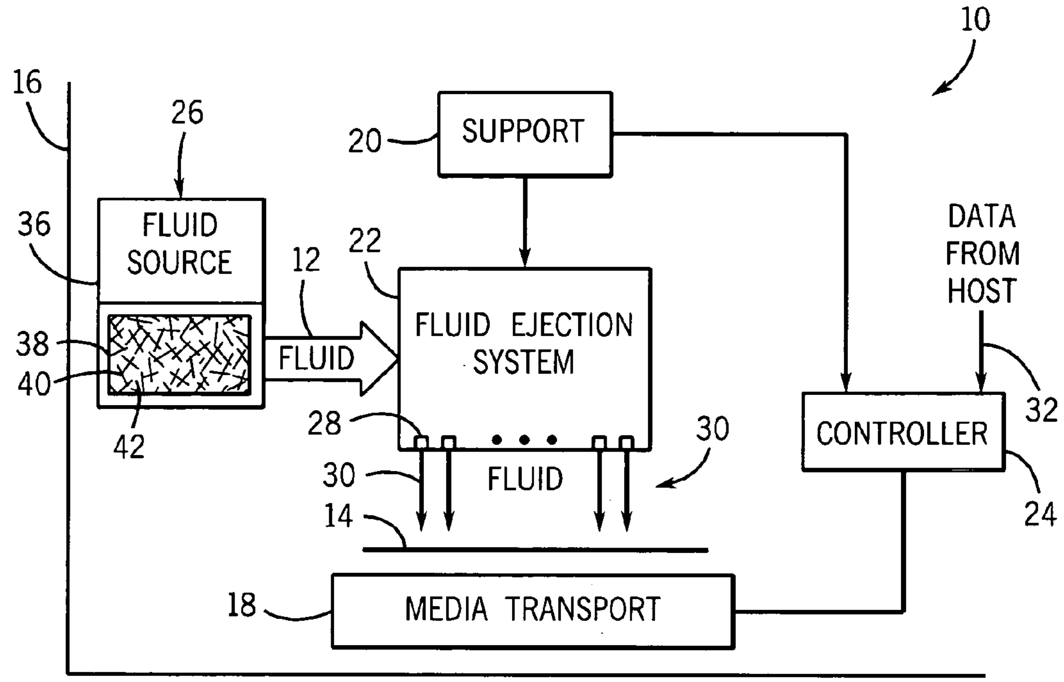
FIG. 1 is a schematic illustration of a fluid deposition system including a fluid supply media according to one exemplary embodiment of the present invention.

FIG. 1 schematically illustrates fluid deposition system 10 configured to deposit a fluid 12 upon a medium 14. Fluid 12 comprises a liquid material such as ink which creates an image upon medium 14. In other applications, fluid 12 may include or carry non-imaging materials, wherein system 10 is utilized to precisely and accurately distribute, proportion and locate materials along medium 14.

Medium 14 comprises a structure upon which fluid 12 is to be deposited. In one embodiment, medium 14 comprises a sheet or roll of a cellulose based or polymeric based material. In other applications, medium 14 may comprise other structures which are more three dimensional in shape.

Fluid deposition system 10 generally includes housing 16, media transport 18, support 20, fluid ejection system 22, controller 24 and fluid supply 26. Media transport 18 comprises a device configured to move medium 14 relative to fluid ejection system 22. Support 20 comprises one or more structures configured to support and position fluid ejection system 22 relative to media transport 18. In one embodiment, support 20 is configured to stationarilly support fluid ejection system 22 as media transport 18 moves medium 14. In such an embodiment, commonly referred to as a page-wide-array printer, fluid ejection system 22 may substantially span a dimension of medium 14.

In another embodiment, support 22 is configured to move fluid ejection system 22 relative to medium 14. For example, support 20 may include a carriage coupled to fluid ejection system 22 and configured to move system 22 along a scan axis across medium 14 as medium 14 is being moved by media transport 18. In particular applications, media transport 18 may be omitted wherein support 20 and fluid ejection system 22 are configured to deposit fluid upon a majority of the surface of medium 14 without requiring movement of medium 14.

Fluid ejection system 22 generally comprises a mechanism configured to eject fluid 12 onto medium 14. In one embodiment, fluid ejection system 22 comprises a print head having a plurality of injection openings or ink jet nozzles 28 configured to dispense fluid 12 in the form of drops 30. In other embodiments, fluid ejection system 22 may include other devices configured to selectively eject fluid 12 upon medium 14.

Controller 24 generally comprises a processor configured to generate control signals which direct the operation of media transport 18, support 20 and fluid ejection system 22. For purposes of disclosure, the term "processor unit" shall mean a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 24 is not limited to any specific combination of hardware circuitry and software, nor to any particular source for the instructions executed by the processing unit.

As indicated by arrow 32, controller 24 receives data signals from one or more sources representing the image or deposition pattern of fluid 12 to be formed on medium 14.

The source of such data may comprise a host system such as a computer or a portable memory reading device associated with system 10. Such data signals may be transmitted to controller 24 along infrared, optical, electric or by other communication modes. Based upon such data signals, controller 24 generates control signals that direct the movement of medium 14 by transport 18, that direct the positioning of fluid ejection system 22 by support 20 (in those embodiments in which support moves ejection system 22) and that direct the timing at which drops 30 of ink 12 are ejected by nozzles 28 of ejection system 22.

Fluid supply 26 supplies fluid 12 to fluid ejection system 22. Fluid supply 26 includes fluid source 36, reservoir 38 and fluid supply media 40. Fluid source 36 serves as a source of fluid 12 to reservoir 38. In one particular embodiment, fluid source 36 comprises a receptacle or chamber containing fluid 12 that is configured to be releasably or removably coupled to reservoir 38 such that fluid flows into reservoir 38 from fluid source 36. For example, fluid source 36 may include a needle which pierces a septum provided on reservoir 38, wherein fluid 12 from source 36 flows into reservoir 38 through the needle. In another embodiment, fluid source 36 comprises a distinct chamber containing fluid 12 that is permanently fixed to reservoir 38 and is configured to supply fluid 12 to reservoir 38 upon actuation of a valving mechanism associated with source 36 or reservoir 38. An example of such an arrangement is found in U.S. Pat. No. 6,679,594 by Robert Sesek and Travis J. Parry entitled Imaging Media Cartridge Having a Reserve Chamber, the full disclosure of which is hereby incorporated by reference.

In yet another embodiment, fluid source 36 comprises a distinct source of fluid configured to deliver fluid to reservoir 38 through one or more conduits, such as tubes using gravitational force, one or more pumping devices or other flow actuating mechanisms. In such an application, fluid source 36 may provide either a one-way fluid delivery system in which fluid flows from source 36 to reservoir 38 or a recirculating fluid delivery system in which fluid flows from source 36 to reservoir 38 and to fluid ejection system 22 and also flows from fluid ejection system 22 to fluid source 36. In other particular applications, fluid may alternatively return from fluid ejection system 22 directly to reservoir 38. In still other embodiments, fluid source 36 is omitted, wherein the entire supply of fluid for fluid ejection system 22 is provided from reservoir 38.

Reservoir 38 comprises one or more structures having an interior configured to receive fluid supply media 40 and fluid 12 within mass 40. Reservoir 38 directs fluid 12 within mass 40 towards fluid ejection system 22. In one particular embodiment, reservoir 38 is directly coupled to fluid ejection system 22. Although reservoir 38 is illustrated as having a rectangular interior, reservoir 38 may have an interior in any of a variety of different shapes and configurations.

Fluid supply media 40 is contained within reservoir 38 and is configured to facilitate reliable flow of fluid 12 through reservoir 38 to fluid ejection system 22. Fluid supply media 40 generally includes an absorbing or fluidphilic material 41 and lamellae inhibiting agent 42. Fluidphilic material 41 is configured to absorb and wick fluid 12 in a direction towards fluid ejection system 22 as fluid is ejected by system 22. Fluidphilic material 41 generally has a surface energy, measured in dynes/centimeter, greater than the surface tension, measured in dynes/centimeter, of fluid 12. Material 41 is wettable with respect to fluid 12. In one particular embodiment, material 41 is hydrophilic, meaning that material 41 is attracted to water so as to absorb and wick water. Material 41 regulates the pressure of the supply of fluid 12 being delivered to fluid ejection system 22. In one embodiment, material 41 includes a multitude of open interconnected cells. In another embodiment, material 41 includes a multitude of pores. Material 41 creates capillary forces which direct fluid 12 toward fluid ejection system 22.

Lamellae inhibiting agents 42 generally comprise fluidphobic materials affixed to or otherwise retained in place relative to material 41 so as to contact fluid 12 along its cells or pores. Agents 42 have a surface energy, measured in dynes/centimeter, less than a surface tension, measured in dynes/centimeter, of fluid 12. According to one exemplary embodiment, agents 42 have a surface energy at least 5 dynes per centimeter less than the surface tension of fluid 12 and nominally at least 10 dynes per centimeter less than the surface tension of fluid 12. In one embodiment, fluid 12 has a surface tension of between about 25 dynes per centimeter and 70 dynes per centimeter and nominally between 25 dynes per centimeter and 50 dynes per centimeter. The surface energy of agent 42 may vary depending upon the surface tension of fluid 12. Agent 42 is non-wettable with respect to fluid 12. In one particular embodiment, agent 42 is hydrophobic, having a composition so as to repel water. In one embodiment, agent 42 comprises polytetrafluoroethylene (TEFLON by Dupont) having a surface tension of approximately 20 dynes per centimeter.

Agents 42 are configured to remain as part of fluid supply media 40 while contacting fluid 12. In one embodiment, agents 42 may comprise solid fluidphobic or lamellae inhibiting materials carried by fluid supply media 40. In another embodiment, agents 42 may comprise a fluid or semi-fluid materials carried by fluid supply media 40. In yet another embodiment, agents 42 may comprise cords, fibers or other lengths of material within or extending through fluidphilic material 41 so as to be retained in place relative to material 41. Examples of fluidphobic materials for lamellae inhibiting agents include, but are not limited to, fluidphobic silica, fluidphobic fats, fluidphobic waxes, fluoropolymers such as Teflon or other material with a low surface energy. One particular example of lamellae inhibiting agent 42 is Surfynol 104, a non-ionic surfactor with wetting and foam control characteristics in aqueous solutions. Another particular example is Teflon, a low surface energy (fluidphobic) fluoropolymer.

Lamellae inhibiting agents 42 enable fluid 12 to be reliably and consistently directed to fluid ejection system 22. In particular, lamellae inhibiting agents 42 reduce or prevent the formation of stable thin liquid films or lamellae across the pores or cells of fluid supply media 40 when fluid 12 is drained or is extracted from fluid supply media 40. Such lamellae would otherwise block off the pores or cells, allowing less ink into fluid supply media 40 and reservoir 38 after each fill and drain cycle. Lamellae inhibiting agents 42 destabilize any formed lamellae, causing them to burst and preventing them from blocking or filling of the pores or cells. However, because lamellae inhibiting agents 42 are carried by or otherwise affixed to fluid supply media 40, antifoam agents 42 are not carried off or absorbed by fluid 12. As a result, lamellae inhibiting agents 42 do not substantially effect the overall composition or characteristics of fluid 12, enabling high quality images or other high quality results from the use of fluid 12 to be sustained. For example, many printing inks utilize surfactants. Lamellae inhibiting agents 42 neutralize such surfactants adjacent to surfaces of fluid supply media 40 to prevent or reduce the formation of lamellae, but at the same time do not substantially neutralize or reduce the overall level of surfactants within fluid 12.

In one embodiment, lamellae inhibiting agents 42 have a generally uniform density throughout fluid supply media 40. In other embodiments, lamellae inhibiting agents 42 have a greater density upon fluid supply media 40 as the distance from fluid ejection system 22 increases to accommodate the more frequent refilling and draining of portions of fluid supply media 40 that are distant from fluid ejection system 22. In other embodiments, lamellae inhibiting agents 42 have a greater density upon fluid supply media 40 proximate to ejection system 22 to ensure that pores proximate to fluid ejection system 22 are not blocked by the formation of lamellae.

Figure 2:
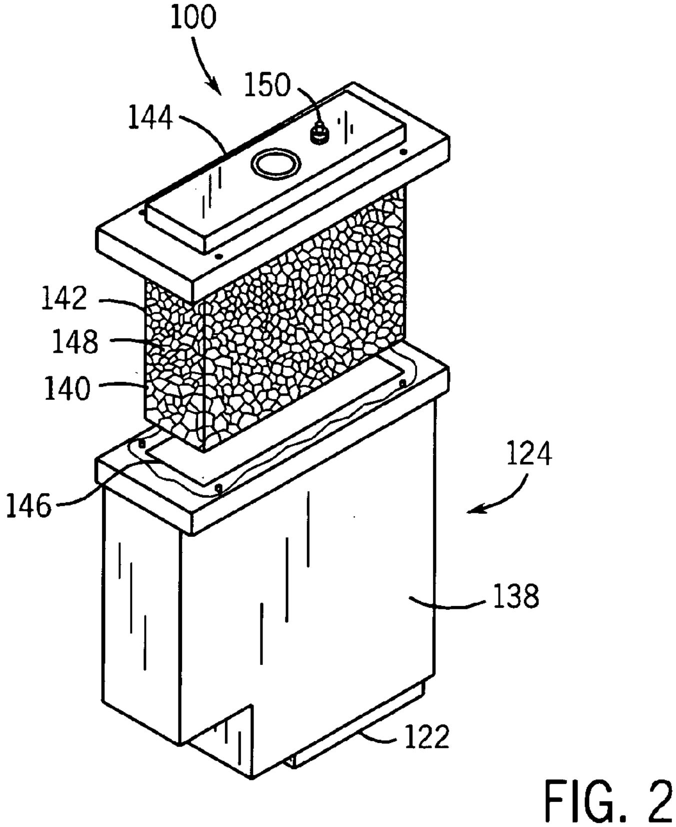
FIG. 2 is a top perspective view of a print cartridge including the fluid supply media according to one exemplary embodiment.

FIG. 2 illustrates ink jet print cartridge 100 which is configured to be used by a fluid deposition system such as system 10 described with respect to FIG. 1. Print cartridge 100 includes fluid ejection system 122 and fluid supply 124. Fluid ejection system 122 comprises a print head having a plurality of nozzles (not shown) configured to eject ink or other fluid. Fluid ejection system 122 is coupled to fluid supply 124.

Fluid supply 124 supplies fluid, such as ink, to fluid ejection system 122 and includes reservoir 138, reservoir fluid supply media 140, lamellae inhibiting agent 142 and closure 144. Reservoir 138 generally comprises a body having an interior 146 configured to contain a fluid to be dispensed by ejection system 122 and fluid supply media 140 with lamellae inhibiting agents 142. In the particular embodiment shown, reservoir 138 is configured to be removably coupled to a carriage and to be conveyed by the carriage along a scan axis across a print medium.

Fluid supply media 140 and lamellae inhibiting agent 142 are identical to fluid supply media 40 and lamellae inhibiting agent 42 discussed with respect to FIG. 1 except that fluid supply media 140 is specifically configured to be received within interior 146. As shown by FIG. 2, fluid supply media 140 includes a multitude of intercommunicating open cells 148. Alternatively, fluid supply media 140 includes a multitude of adjacent pores. Lamellae inhibiting agents 142 are generally situated along perimeters or boundary surfaces of the cells or pores. As discussed with respect to FIG. 1, lamellae inhibiting agents 142 ensure the reliable and consistent flow of fluid through fluid supply media 140 within reservoir 138 to fluid ejection system 122.

Closure 144 comprises a cover configured to cooperate with the body of reservoir 138 to enclose fluid supply media 140 and fluid within interior 146. In the particular embodiment shown, closure 144 is configured to seal interior 146. Closure 144 includes fill port 150.

Fill port 150 generally comprises an inlet through closure 144, enabling cartridge 100 to be refilled with fluid. In the particular embodiment illustrated, fill port 150 includes a mechanism configured to seal the opening provided by fill port 150 once filling of cartridge 100 is completed or is caused. In one application, the sealing mechanism may automatically seal any formed opening such as a valving mechanism or a septum. In another application, fill port 150 may be configured to be manually closed when not in use.

Although reservoir fluid supply media 140 and lamellae inhibiting agents 142 are shown in the exploded view as being removable from interior 146 and as being affixed to closure 144 to form a single unit, fluid supply media 140 and lamellae inhibiting agent 142 may alternatively be separatable from closure 144 as well as reservoir 138 or may be affixed to reservoir 138 within interior 146. Although fluid supply media 140 is illustrated as being exposed upon being removed from interior 146, fluid supply media 140 may alternatively be encapsulated or at least surrounded by a film or fluid impervious container along its outer periphery. In such an application, reservoir 138 or fluid ejection system 122 is configured to puncture or pierce fluid impervious film or bag or the fluid impervious film or bag is additionally provided with an outlet such as a needle or a valving mechanism which selectively provides fluid communication between fluid within fluid supply media 140 and fluid ejection system 122.

Figure 3:
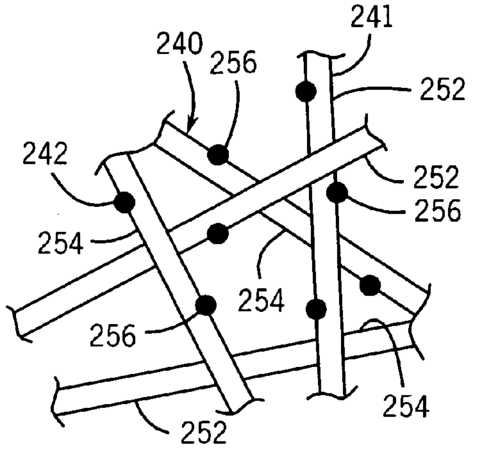
FIG. 3 is a fragmentary top plan view of a first embodiment of the fluid supply media.

FIGS. 3–8 illustrate particular examples of fluid supply media 40 or 140 and lamellae inhibiting agents 140 or 142. FIG. 3 illustrates fluid supply media 240 which include fluidphilic material 241 and lamellae inhibiting agents 242. Material 241 comprises one or more lengths 252 which cross one another so as to form a matrix having pores 254. For purposes of this disclosure, a "length" of material means any elongate structure of one or more materials such as a single fiber, a plurality of fibers extending along one another, twisted or wrapped about one another or interwoven, a plurality of cords extending along one another or wrapped about or interwoven with respect to one another, or one or more bands of one or more materials extending along one another or wrapped or interwoven with respect to one another. The term "length" is not limited to a particular cross-sectional shape, a specific number of individual filaments or fibers or a particular number or type of materials. In one particular embodiment, each length 252 comprises an individual fiber, filament or band. In another embodiment, each length 252 comprises a strand or cord of multiple fibers or bands.

Lengths 252 are formed from one or more fluidphilic materials, enabling lengths 252 to wick fluids such as ink. Examples of fluidphilic material from which lengths 252 may be formed include polyester, nylon and rayon. In the particular embodiment illustrated, lengths 252 are formed from polyester, have individual diameters of between about 15 um and 30 um and provide mass 40 or 140 with an overall density of between about 0.05 $g/cm^3$ and 0.20 $g/cm^3$. In one particular embodiment, lengths 252 are formed from polyester and have individual diameters of 21 micrometers and an overall density of about 0.13 grams per centimeter cubed. In other embodiments, lengths 252 may be formed from other fluidphilic materials, may have larger or smaller diameters and may have a higher or lower density. Although lengths 252 are illustrated as being linear, as having uniform diameters along their lengths and as crisscrossing one another in a random fashion, lengths 252 may alternatively be nonlinear, may alternatively have non-uniform diameters and may crisscross one another in a repeating or consistent pattern as in a woven material.

Lamellae inhibiting agents 242 comprise lamellae inhibiting materials such as surfactors or fluidphobic materials carried by lengths 252 of fluid supply media 240 at a multitude of intermittent spaced locations 256 adjacent to pores 254. In one embodiment, agents 242 comprise solids. In other embodiments, agents 242 comprise fluids. Lamellae inhibiting agents 242 have a minimum quantity such that the amount and spacing of locations 256 is sufficient to substantially limit lamellae formation across pores 252 and upon fluid supply media 240. At the same time, lamellae inhibiting agents 242 have a maximum quantity such that a sufficient surface area of lengths 252 remains uncovered by lamellae inhibiting agents 242 to allow adequate fluidphilic uptake of fluid by lengths 252. In one particular embodiment, lamellae inhibiting agents 242 comprise fluidphobic silica and represent between about 1 percent and 50 percent of the length surface area and nominally between about 5 percent and 25 percent of the length surface area. In other embodiments, lamellae inhibiting agents 242 may comprise other material or materials and have greater or lesser densities.

Figure 4:
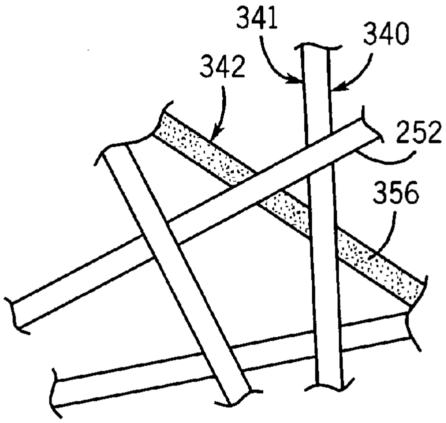
FIG. 4 is a fragmentary top plan view of a second embodiment of the fluid supply media.

FIG. 4 illustrates fluid supply media 340 including fluidphobic material 341 and lamellae inhibiting agents 342. Material 341 is substantially identical to material 241. Lamellae inhibiting agents 342 are similar to lamellae inhibiting agents 242 except that lamellae inhibiting agents 342 are not disbursed at distinct spaced locations 256 but are concentrated along lengths 356 interspersed amongst lengths 252 of fluid supply media 340. In one embodiment, each length 356 comprises a length 252 completely coated with an lamellae inhibiting material along its entire axial length. In another embodiment, an entirety of length 356 is formed from a fluidphobic material or surfactor. In still another embodiment, each length 356 may comprise a length of one or more materials distinct from lengths 252 which is coated with lamellae inhibiting agents 342. Lengths 356 are mixed in with lengths 252 at a ratio sufficiently high to limit lamellae stabilization, yet low enough to enable fluidphilic uptake of fluid by porous material 340. In one particular embodiment, lengths 356 the ratio of lengths 356 to lengths 252 is between about 10 percent and 50 percent. In one particular embodiment, lengths 356 have a Teflon outer surface and the ratio of lengths 256 to lengths 252 is approximately 20%. In other embodiments, other lamellae inhibiting agent materials may be employed and different length ratios may be provided.

Figure 5:
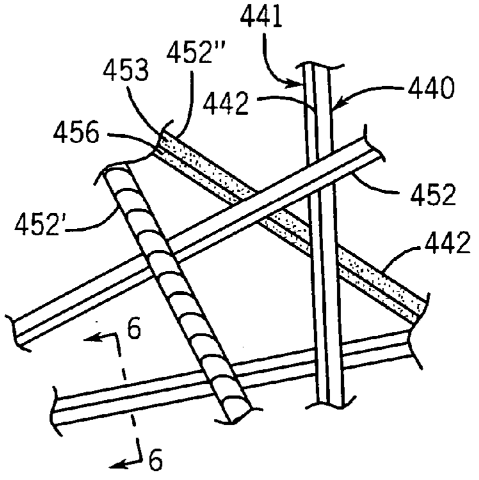
FIG. 5 is a fragmentary top plan view of a third embodiment of the fluid supply media.
Figure 6:
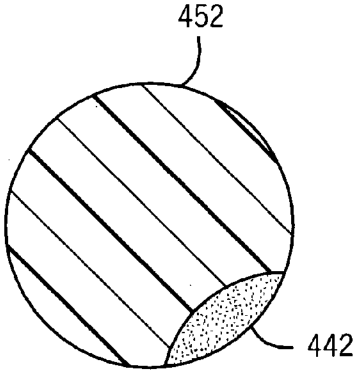
FIG. 6 is a cross-sectional view of the fluid supply media taken along line 6—6 of FIG. 5.

FIGS. 5 and 6 illustrate fluid supply media 440 which includes fluidphilic material 441 and lamellae inhibiting agents 442. Fluid supply media 440 includes lengths 452. Lengths 452 are similar to lengths 252 except that each length 452 carries an lamellae inhibiting agent 442 in a substantially continuous fashion from one axial end to another axial end.

Lamellae inhibiting agent 442 has one or more fluidphobic materials extending along an outer surface of each length 452 while not completely coating the entirety of the outer surface of each length 452. The extent of the outer surface of each length 452 which underlies lamellae inhibiting agent 442 is sufficiently low such that lamellae inhibiting agent 442 adequately limits lamellae stabilization, but is sufficiently large enough to enable fluidphilic uptake of fluid by each length 452. In one embodiment, length 452 is formed from a fluidphilic material such as polyester while lamellae inhibiting agent 442 comprises surfynol 104. The lamellae inhibiting agent 442 occupies between about 1 percent and 50 percent of the outer circumference of each length 452 and nominally between about 5 percent and 25 percent of the outer circumference of each length 452. In other embodiments, the fluidphilic material chosen for length 452, the material chosen for lamellae inhibiting agent 442 and the percent of length 452 covered by lamellae inhibiting agent 442 may be varied.

In the embodiment shown in FIGS. 5 and 6, length 452 and lamellae inhibiting agent 442 are formed together as a single continuous overall filament having a generally smooth outer circumference. In such an embodiment, lamellae inhibiting agent 442 may be formed by either adding lamellae inhibiting agent 442 to the material of length 452 having an axial channel or groove, or removing portions of length 452 around lamellae inhibiting agent 442. In still other embodiments, lamellae inhibiting agent 442 may be coated upon a length 452 having a generally circular cross-sectional surface. Although length 452 and lamellae inhibiting agent 442 are illustrated as combining to form a composite filament having a circular cross section, length 452 may alternatively have a rectangular, triangular or other cross sectional shape alone or in combination with lamellae inhibiting agent 442. Although lamellae inhibiting agent 442 is illustrated in FIG. 5 as lineally extending along an axis of each length 452, lamellae inhibiting agent 442 may alternatively extend along the axis of each length 452 in a non-linear fashion. For example, lamellae inhibiting agent 442 may spiral about the axis of length 452'.

As further shown by FIG. 5, fluid supply media 440 may additionally include lengths 452" which include a mixture of fluidphilic fibers or filaments 453 and fibers 456 that include a fluidphobic material. In one embodiment, fibers 456 include lamellae inhibiting material interspersed along spaced locations of fiber 456. In another embodiment, fibers 456 are either completely formed from an lamellae inhibiting material or are substantially coated with or covered by an lamellae inhibiting material. In one embodiment, fibers 453 and 456 are interwoven to form length 452". In another embodiment, fibers 453 and 465 are joined or otherwise coupled to one another by other means.

Figure 7:
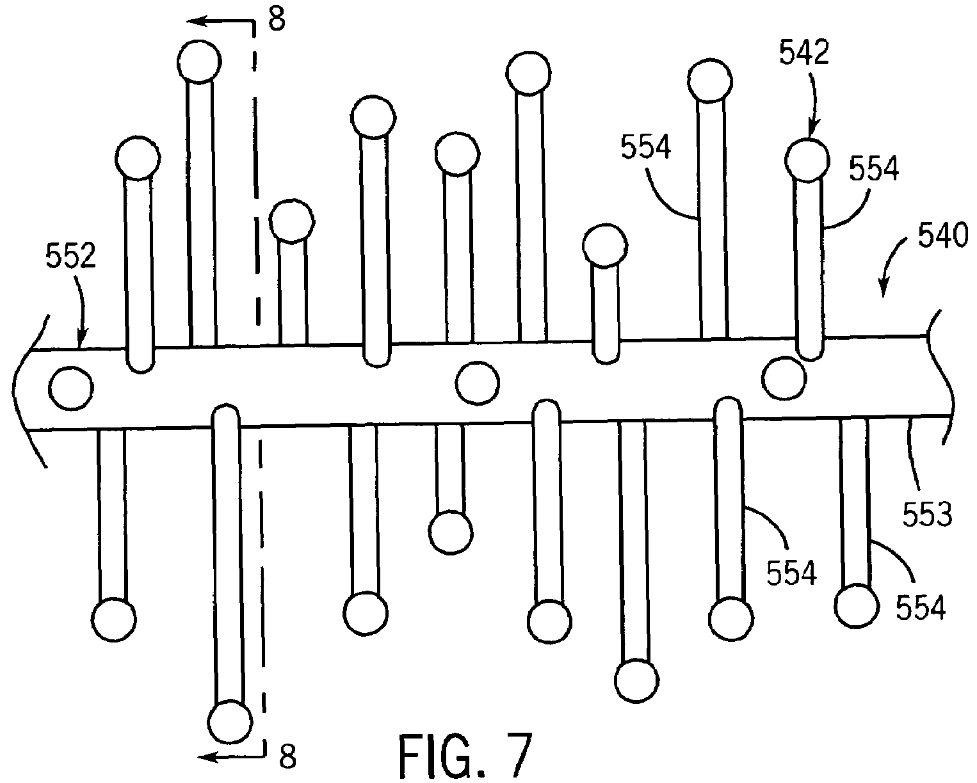
FIG. 7 is a fragmentary side elevational view of a single fiber of a fourth embodiment of the fluid supply media.
Figure 8:
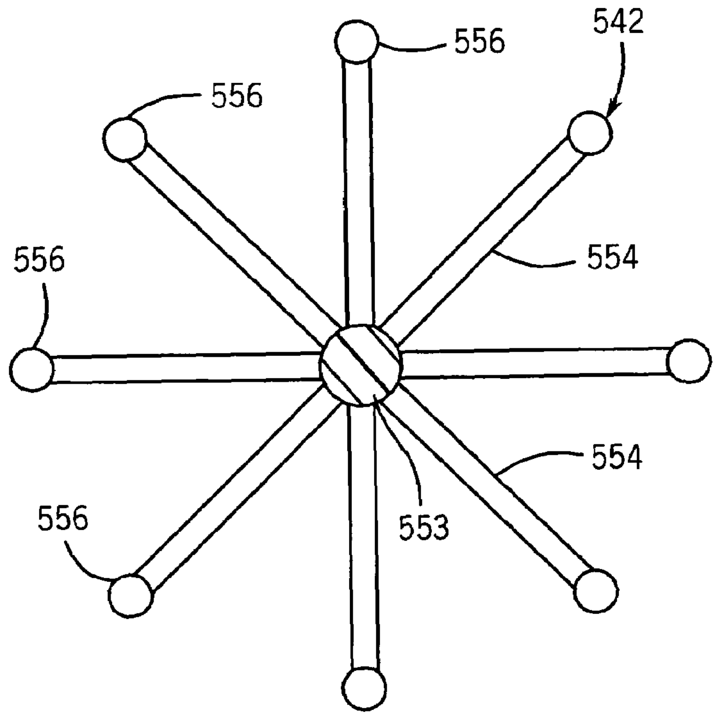
FIG. 8 is a sectional view of the fiber of FIG. 7 taken along line 8—8.

FIGS. 7 and 8 illustrate fluid supply media 540 including fluidphilic material 541 and lamellae inhibiting agents 542. Material 541 includes a plurality of fibers 552, such as the ones shown in FIGS. 7 and 8. Each fiber 552 includes a hub 553 and a plurality of lobes 554 projecting from hub 553 in multiple radial directions. Lamellae inhibiting agents 542 comprise lamellae inhibiting materials located proximate to ends or tips 556 of lobes 554. Hub 553 and lobes 554 are formed from one or more fluidphilic materials, enabling hub 553 and lobes 554 to wick fluid. In another embodiment, only lobes 554 may be formed from one or more fluidphilic materials.

Lamellae inhibiting agents 542 are located at ends 556 prevent or minimize the formation of lamellae across any gaps or pores created between porous material 540. At the same time, hub 553 and lobes 554 wick fluid to move fluid under capillary forces towards fluid ejection system 22 or 122.

Although porous material 540 is illustrated as having eight equiangularly spaced lobes 554, each fiber 552 of porous material 540 may alternatively include a greater or fewer number of such lobes 554. For example, in one other embodiment, each fiber 552 may include three equally angularly spaced lobes 554. In some other embodiments, lobes 554 extending from hub 553 may be non-uniformly located about hub 553. Moreover, although lamellae inhibiting agents 542 are illustrated as being located on ends 556 of each lobe 554, lamellae inhibiting agents 542 may alternatively be selectively located on alternating lobes or may be randomly located upon particular lobes 554.

Overall, lamellae inhibiting agents 542 contact fluid 12 (shown in FIG. 1) within reservoir 38 or 138 to destabilize any lamellae being formed as fluid 12 drains through the porous material within the reservoir. Because the lamellae inhibiting agent does not become absorbed by the fluid but remains affixed to the porous material, the lamellae inhibiting agent does not detrimentally affect the characteristics of fluid 12. Although the lamellae inhibiting agent is in sufficient quantity and density to minimize the formation of lamellae, the lamellae inhibiting agent does not have a sufficient quantity or density so as to cover, overlie or coat a sufficient surface area of the reservoir porous material to prevent or substantially impair the wicking of fluid towards the fluid ejection device by the porous material.

Figure 9:
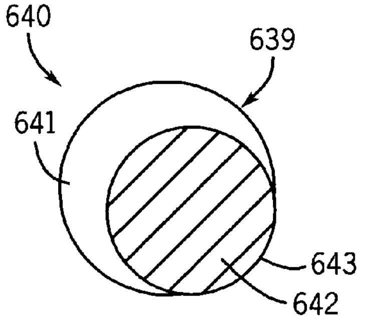
FIG. 9 is a sectional view of a single fiber of a fifth embodiment of the fluid supply media.

FIGS. 9–13 illustrate other embodiments of fluid supply media 40 shown in FIG. 1. FIG. 9 is a cross sectional view of an individual length 639 of a fluid supply media 640.

Length 639 incorporates both fluidphilic material 641 and lamellae inhibiting agent 642. As shown by FIG. 9, agent 642 forms a core of length 639 and has an exposed portion 643. Exposed portion 643 is configured to contact fluid along pores of mass 640 to prevent the formation of lamellae. At the same time, fluidphilic material 641 extends partially about agent 642 and absorbs or wicks the fluid through mass 640. In one particular embodiment, fluidphilic material 641 and agent 642 are coextruded to form length 639.

Figure 10:
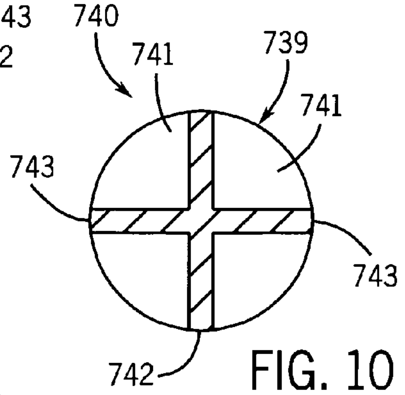
FIG. 10 is a sectional view of a single fiber of a sixth embodiment of the fluid supply media.

FIG. 10 is a cross sectional view of an individual length 739 of a fluid supply media 740 which includes either a plurality of such lengths 739 or a single length 739 arranged so as to provide a multitude of pores. Length 739 includes fluidphilic material 741 and lamellae inhibiting agent 742. Material 741 is configured to absorb or wick fluid along an axis of length 739. At the same time, agent 742, which is formed from a fluidphobic material, is configured to extend along pores of mass 740 so as to prevent the formation of lamellae across such pores. In particular, agent 742 includes an exposed portion 743 which contacts fluid along the pores of mass 740. In one particular embodiment, material 740 and agent 742 are coextruded to form length 739.

Figure 11:
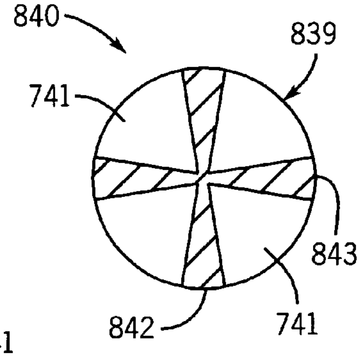
FIG. 11 is a cross sectional view of a single fiber of a seventh embodiment of the fluid supply media.

FIG. 11 is a cross sectional view of a length 839 forming part of media 840. Length 839 is substantially identical to length 739 except that length 839 includes lamellae inhibiting agents 842 in lieu of agent 742. Agents 842 are similar to agents 742 except that agent 842 widens from an axial center of length 839 so as to have an enlarged exposed portion 843 for contacting fluid and preventing the formation of lamellae along pores of mass 840.

Figure 12:
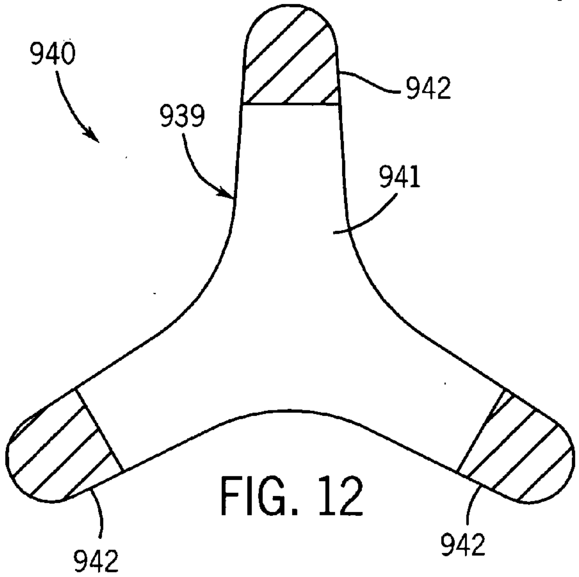
FIG. 12 is a sectional view of a single fiber of an eighth embodiment of the fluid supply media.
Figure 13:
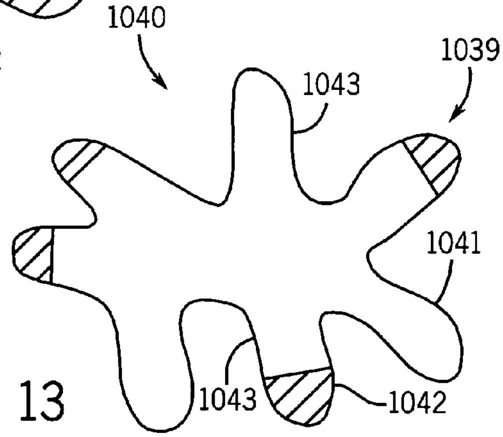
FIG. 13 is a sectional view of a single fiber of a ninth embodiment of the fluid supply media.

FIGS. 12 and 13 illustrate lengths of a fluid supply media, wherein such lengths do not have a circular cross section. FIG. 12 is a cross sectional view of an individual length 939 which is part of fluid supply media 940. Length 939 incorporates fluidphilic material 941 and lamellae inhibiting agent 942. Length 939 has a generally 3-lobed cross sectional shape along its center line or axis. Fluidphilic material 941 forms a central portion of length 939 while agent 942 forms tips at ends of each of the three lobes. In one particular embodiment, material 941 and agent 942 are coextruded together to form length 939.

FIG. 13 is a cross sectional view of a length 1039 provided as part of a fluid supply media 1040. Length 1039 includes both fluidphilic material 1041 and lamellae inhibiting agent 1042. Length 1039 has a generally irregular cross sectional shape with multiple fingers 1043. Fluidphilic material 1041 forms an entirety of some of fingers 1043. Agents 1042, including one or more fluidphobic materials, form tips of some of the other fingers 1043. Fluidphilic material 1041 absorbs or wicks fluid through mass 1040. At the same time, agents 1042 are located along a sufficient number of fingers 1043 so as to extend along the pores of mass 1040 to prevent the formation of lamellae. As shown by FIGS. 12 and 13, the cross sectional shape of lengths forming the fluid supply media may have a variety of different configurations.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A fluid supply comprising:

a reservoir;

a media within the reservoir and including a lamellae inhibiting agent, wherein the media is configured to receive a fluid having a surface tension and wherein the agent has a surface energy at least 5 dynes per centimeter less than the surface tension.

2. The supply of claim 1, wherein the media includes at least one length of at least one material.

3. The supply of claim 2, wherein the lamellae inhibiting agent is intermittently disposed along the at least one length at a plurality of spaced locations.

4. The supply of claim 2, wherein the at least one length is at least partially fluidphilic.

5. The supply of claim 2, wherein the at least one length has a stripe of the lamellae inhibiting agent.

6. The supply of claim 5, wherein the stripe substantially extends from a first end to a second end of the at least one length.

7. The supply of claim 5, wherein the stripe linearly extends along the at least one length.

8. The supply of claim 5, wherein the stripe nonlinearly extends along the at least one length.

9. The supply of claim 8, wherein the stripe spirals about the at least one length.

10. The supply of claim 2, wherein each of the at least one length of the at least one material includes:

a hub; and a plurality of lobes extending from the hub and terminating at ends, wherein the ends carry the lamellae inhibiting agent.

11. The supply of claim 10, wherein the hub and a majority of each lobe is fluidphilic.

12. The supply of claim 1, wherein the media includes a plurality of lengths.

13. The supply of claim 12, wherein a first portion of the lengths include the lamellae inhibiting agent and wherein a second portion of the lengths omit the lamellae inhibiting agent.

14. The supply of claim 13, wherein the first portion of the lengths are coated with the lamellae inhibiting agent.

15. The supply of claim 14, wherein the first portion of the lengths are completely coated with the lamellae inhibiting agent.

16. The supply of claim 1, wherein the lamellae inhibiting agent is a solid.

17. The supply of claim 1, wherein the lamellae inhibiting agent is selected from a group including:

fluidphobic silica, fluidphobic fat, fluidphobic wax and fluoropolymers.

18. The supply of claim 1, where the media includes a fluidphilic material and wherein the lamellae inhibiting agent has a minimum quantity to limit lamellae formation on the material, and a maximum quantity that allows uptake of fluid by the fluidphilic material.

19. The supply of claim 1, wherein the media includes a plurality of pores and wherein the lamellae inhibiting agent is exposed along each pore.

20. The supply of claim 1, wherein the media includes at least one length having a mixture of fibers, wherein only a portion of the fibers carry the lamellae inhibiting agent.

21. The supply of claim 1, wherein the surface energy is at least 10 dynes per centimeter less than the surface tension.

22. The supply of claim 1, wherein the media includes the lamellae inhibiting agent prior to any contact with a fluid to be supplied by the fluid supply.

23. The supply of claim 1 including the fluid within the reservoir and within the media.

24. The supply of claim 23, wherein the surface energy is at least 10 dynes per centimeter less than the surface tension.

25. The supply of claim 23, wherein the fluid has a surface tension of between about 25 dynes per centimeter and 70 dynes per centimeter.

26. The supply of claim 23, wherein the fluid has a surface tension of no greater than 50 dynes per centimeter.

27. The supply of claim 23, wherein the agent has a surface energy of no greater than 30 dynes per centimeter.

28. The supply of claim 1 wherein the media includes at least one length of material in wherein the at least one length of material has a non-symmetrical cross-sectional shape.

29. The supply of claim 1, wherein the media is configured to receive a fluid having a surface tension and wherein at least portions of the media have exposed surfaces having a surface energy greater than the surface tension.

30. The supply of claim 29, wherein the agent has a surface energy less than the surface tension.

31. The supply of claim 1, wherein the agent comprises at least one length extending through the media.

32. The supply of claim 1, wherein the media includes at least one length of material having a center and a plurality of extensions extending from the center and wherein the lamellae inhibiting agent is carried by tips of at least a portion of the plurality of extensions.

33. The supply of claim 32, wherein the fluid media and the at least one length occupy a volume of which at least 20 percent is provided by the at least length.

34. The supply of claim 1, wherein the reservoir is configured to be refilled with a fluid.

35. The supply of claim 1, wherein the supply media includes at least one length of material having an axial center and an outer circumferential surface, wherein the lamellae inhibiting agent extends along the center and along a first portion of the outer circumferential surface and wherein a second portion of the outer circumferential surface includes a fluidphilic material.

36. The supply of claim 1, wherein the media includes at least one length formed entirely of the lamellae inhibiting agent.

37. A fluid deposition system comprising:

a fluid-dispensing device configured to dispense fluid upon a medium; and a fluid supply including a reservoir having an interior in fluid communication with a fluid-dispensing device;

a media within the reservoir and including a lamellae inhibiting agent prior to the media being in contact with the fluid.

38. The system of claim 37, wherein the media includes at least one length.

39. The system of claim 38, wherein he lamellae inhibiting agent is intermittently disposed along the at least one length at a plurality of spaced locations.

40. The system of claim 38, wherein the at least one length is fluidphilic.

41. The system of claim 38, wherein the at least one of length has a surface stripe of the lamellae inhibiting agent.

42. The system of claim 41, wherein the surface stripe substantially extends from a first end to a second end of the at least one each length.

43. The system of claim 38, wherein the at least one length includes:

a hub; and a plurality of lobes extending from the hub and terminating at ends, wherein the ends carry the lamellae inhibiting agent.

44. The system of claim 43, wherein the hub and a majority of each lobe is fluidphilic.

45. The system of claim 37, wherein the lamellae inhibiting agent is selected from a group including:

fluidphobic silica, fluidphobic fat, fluidphobic wax and fluoropolymers.

46. The system of claim 37, wherein the lamellae inhibiting agent is a solid.

47. The system of claim 37, wherein the lamellae inhibiting agent has a minimum quantity to limit lamellae formation on the media, and a maximum quantity that allows uptake of fluid by the media.

48. The system of claim 37, wherein the mess includes a plurality of pores and wherein the lamellae inhibiting agent is exposed along each pore.

49. The system of claim 37, wherein the fluid dispensing device includes a print head.

50. The system of claim 37 including a carriage configured to move the fluid-dispensing device across the medium.

51. The system of claim 37, wherein the media includes a plurality of lengths.

52. The system of claim 37, wherein a first portion of plurality of lengths includes the lamellae inhibiting agent and wherein a second portion of the plurality of lengths omit the lamellae inhibiting agent.

53. The system of claim 52, wherein the first portion of the plurality of lengths are coated with the lamellae inhibiting agent.

54. The system of claim 53, wherein the fist portion of the plurality of lengths are completely coated with the lamellae inhibiting agent.

55. The system of claim 51, wherein at least one of the plurality of lengths is formed entirely from the lamellae inhibiting agent.

56. A media for use in a fluid supply, the media comprising:

a material having pores; and a lamellae inhibiting agent retained relative to the material proximate to the pores prior to the media being in contact with a fluid to be supplied by the fluid supply.

57. A fluid supply comprising:

a reservoir;

a material having pores within the reservoir; and means coupled to the material for inhibiting formation of lamellae across the pores, the means being coupled prior to the material contacting a fluid to be supplied by the fluid supply.

58. A method for supplying fluid comprising:

depositing fluid into a reservoir, the fluid having a surface tension;

wicking the fluid using fluidphilic material having pores through the reservoir to a discharge location; and contacting the fluid along the pores with a lamellae inhibiting agent having a surface energy at least 5 dynes per centimeter less than the surface tension to inhibit formation of lamellae.

* * * * *

UNITED STATES PATENT AND TRADEMARK OFFICE

CERTIFICATE OF CORRECTION

PATENT NO. : 7,147,311 B2
APPLICATION NO. : 10/808998
DATED : December 12, 2006
INVENTOR(S) : Joseph Stellbrink et al.

It is certified that error appears in the above-identified patent and that said Letters Patent is hereby corrected as shown below:

In column 11, line 20, in Claim 28, after “claim 1” insert -- , --.

In column 11, line 36, in Claim 33, after “wherein the” delete “fluid”.

In column 11, line 41, in Claim 35, after “wherein the” delete “supply”.

In column 11, line 61, in Claim 39, delete “he” and insert -- the --, therefor.

In column 12, line 22, in Claim 48, delete “mess” and insert -- mass --, therefor.

In column 12, line 38, in Claim 54, delete “fist” and insert -- first --, therefor.

Signed and Sealed this

Twenty-fifth Day of November, 2008

JON W. DUDAS

*Director of the United States Patent and Trademark Office*